United States Patent
Dent

(10) Patent No.: US 8,086,271 B2
(45) Date of Patent: Dec. 27, 2011

(54) NETWORK ARCHITECTURE FOR MOBILE COMMUNICATION NETWORK WITH BILLING MODULE FOR SHARED RESOURCES

(75) Inventor: Paul W. Dent, Pittsboro, NC (US)

(73) Assignee: Ericsson Inc., Plano, TX (US)

( * ) Notice: Subject to any disclaimer, the term of this patent is extended or adjusted under 35 U.S.C. 154(b) by 2561 days.

(21) Appl. No.: 09/952,272

(22) Filed: Sep. 12, 2001

(65) Prior Publication Data

US 2003/0050100 A1    Mar. 13, 2003

(51) Int. Cl.
*H04M 1/00* (2006.01)
(52) U.S. Cl. ..... 455/562; 455/406; 455/405; 455/422.1; 455/414.1; 455/562.1; 370/207; 370/347; 370/431; 370/449; 370/511
(58) Field of Classification Search .......... 455/446–448, 455/454, 433, 19, 8, 82, 83, 84, 406, 408, 455/405, 552.1, 561, 562.1, 575.7, 562, 258, 455/260, 445; 375/141, 146, 142, 148, 259, 375/219; 370/319, 320, 322, 232, 347; 379/114; 709/229; 705/40, 52; 340/5.61
See application file for complete search history.

(56) References Cited

U.S. PATENT DOCUMENTS

| | | | | | |
|---|---|---|---|---|---|
| 4,916,460 | A | * | 4/1990 | Powell | 343/853 |
| 5,386,203 | A | * | 1/1995 | Ishihara | 333/129 |
| 5,471,497 | A | * | 11/1995 | Zehavi | 375/142 |
| 5,781,865 | A | * | 7/1998 | Gammon | 455/561 |
| 5,828,737 | A | * | 10/1998 | Sawyer | 379/114.07 |
| 5,884,157 | A | * | 3/1999 | Karmi | 455/406 |
| 5,940,384 | A | * | 8/1999 | Carney et al. | 370/347 |
| 6,324,395 | B1 | * | 11/2001 | Khayrallah et al. | 455/406 |
| 6,327,254 | B1 | * | 12/2001 | Chuah | 370/328 |
| 6,415,001 | B1 | * | 7/2002 | Li et al. | 375/259 |
| 6,453,030 | B1 | * | 9/2002 | Boutwell et al. | 379/114.2 |
| 6,480,528 | B1 | * | 11/2002 | Patel et al. | 375/148 |
| 6,498,786 | B1 | * | 12/2002 | Kirkby et al. | 370/322 |
| 6,587,448 | B1 | * | 7/2003 | Dajer et al. | 370/335 |
| 6,658,263 | B1 | * | 12/2003 | Ke et al. | 455/524 |
| 6,804,540 | B1 | * | 10/2004 | Shepherd et al. | 455/562.1 |
| 6,810,257 | B1 | * | 10/2004 | Amin | 455/445 |
| 6,879,584 | B2 | * | 4/2005 | Thro et al. | 370/352 |
| 7,043,270 | B2 | * | 5/2006 | Judd et al. | 455/561 |
| 7,092,696 | B1 | * | 8/2006 | Hosain et al. | 455/405 |
| 7,505,531 | B1 | * | 3/2009 | Pasternak et al. | 375/298 |
| 2001/0012788 | A1 | * | 8/2001 | Gammon | 455/562 |
| 2001/0037395 | A1 | * | 11/2001 | Sabat et al. | 709/229 |
| 2002/0022483 | A1 | * | 2/2002 | Thompson et al. | 455/439 |

(Continued)

FOREIGN PATENT DOCUMENTS

WO    WO96/29832    9/1996

(Continued)

*Primary Examiner* — Pierre-Louis Desir
*Assistant Examiner* — Michael Vu
(74) *Attorney, Agent, or Firm* — Coats & Bennett, P.L.L.C.

(57) ABSTRACT

A mobile communication network includes an antenna site shared by two or more telecommunications service providers. The antenna site includes a shared resource, such as an antenna, telecommunications equipment, or bandwidth, used by multiple service providers and connects to multiple signal processing centers, each of which belongs to one of the service providers. The signal processing centers may provide modulating signals to the antenna site to use in modulating a carrier. The antenna site may also direct received signals from mobile terminals to the signal processing center for the appropriate service provider. A billing module at the antenna site maintains an accounting of resources used by each service provider.

26 Claims, 4 Drawing Sheets

U.S. PATENT DOCUMENTS

| | | | |
|---|---|---|---|
| 2002/0095400 A1* | 7/2002 | Johnson et al. | 707/1 |
| 2002/0113686 A1* | 8/2002 | Shannon Carravallah | 340/5.61 |
| 2002/0133412 A1* | 9/2002 | Oliver et al. | 705/26 |
| 2002/0183030 A1* | 12/2002 | Damgaard et al. | 455/258 |
| 2003/0032454 A1* | 2/2003 | Judd | 455/562 |
| 2003/0033253 A1* | 2/2003 | Rhodes | 705/52 |
| 2003/0050100 A1* | 3/2003 | Dent | 455/562 |
| 2003/0115141 A1* | 6/2003 | Felix et al. | 705/40 |
| 2003/0222819 A1* | 12/2003 | Karr et al. | 342/457 |

FOREIGN PATENT DOCUMENTS

| | | |
|---|---|---|
| WO | WO02/073993 | 9/2002 |

* cited by examiner

NETWORK ARCHITECTURE FOR MOBILE COMMUNICATION NETWORK WITH BILLING MODULE FOR SHARED RESOURCES

BACKGROUND OF THE INVENTION

The present invention relates generally to mobile communication networks, and, more particularly, to a network architecture for a mobile communication network that allows multiple telecommunications service providers to share communication resources.

Mobile communication systems typically comprise a plurality of base transceiver stations located at different antenna sites corresponding to the cells in the mobile communication system. The base transceiver stations connect to base station controllers (BSCs), which in turn connect to an mobile switching center (MSC). The MSC connects to the Public Switched Telephone Network (PSTN).

The base transceiver stations comprise a plurality of transmitters and receivers for communicating with mobile terminals within a cell. The transmitters receive digital data for transmission to the mobile terminals, encode the data, and modulate an assigned carrier frequency with the encoded data. Encoding the data for transmission may for example entail error detection or error correction coding to protect the data from errors that may occur during transmission, compression of the data to remove redundancy, and/or encryption to protect the data from eavesdroppers. The receivers located at the base transceiver stations receive signals transmitted from the mobile terminals, demodulate and decode the received signals to extract the originally transmitted information bits, and convey the information bits via a BSC to the MSC. The mobile communication system may use any one of a variety of multiple access methods, such as Time Division Multiple Access (TDMA), Code Division Multiple Access (CDMA), Frequency Division Multiple Access (FDMA), or frequency hopping.

In present day wireless communication systems, a single manufacturer may provide the MSC, BSC, and all the equipment at the base transceiver stations to ensure compatibility between components. A single entity, such as a telecommunications service provider, typically owns all of this telecommunications equipment and charges subscribers for communication services provided using this equipment.

Antenna sites are not necessarily owned by telecommunications service providers, but instead may be rented from another party. The antenna sites frequently include structures, such as towers or buildings, on which antennas are mounted. For example, American Tower Corporation is an entity that specializes in acquiring and renting antenna sites and towers to telecommunications service providers.

Many telecommunications service providers today enter agreements that allow their subscribers to use the equipment and services of another telecommunications service provider. These agreements allow subscribers to roam outside the coverage area of their own telecommunications service provider. The standard known as the Global System for Mobile Communications (GSM) in particular has subscriber authentication provisions to enable service providers to authenticate subscribers of other service providers roaming in their coverage area. These provisions allow service providers to provide service to a roaming subscriber with confidence that a bill for the service provided can be sent to the subscriber's primary service provider and that the bill will not be disputed.

In the past, a single service provider typically owned all technical communication equipment used to provide service to subscribers. To provide for billing of services to roaming subscribers, different service providers must have compatible billing systems that facilitate cross billing another service provider for services provided to roaming subscribers. In prior art systems, a subscriber roaming in a region served by two or more service providers makes or receives calls using the equipment of either service provider, but never via both at the same time. This restriction provides a less reliable service and lower total capacity than might otherwise be achievable.

SUMMARY OF THE INVENTION

The present invention relates to a new architecture for a mobile communication network that allows sharing of communication resources, such as antennas, telecommunications equipment, and bandwidth. According to the present invention, the mobile communication network comprises one or more antenna sites, which typically comprise an antenna and telecommunications equipment for communicating with mobile terminals. Each antenna site may be coupled via a link interface to multiple signal processing centers, which may be owned by different telecommunications service providers. The antenna site may receive modulating signals, which it uses to modulate an RF carrier, from two or more signal processing centers. The single antenna site may also receive signals from subscriber terminals served by different service providers, which it forwards to two or more signal processing centers. By using the network architecture according to the present invention, telecommunications service providers can share the same antenna sites and telecommunications equipment, thereby reducing their operating costs. A billing module located at the antenna site maintains an accounting based on the respective utilization of resources by the telecommunications service providers.

DETAILED DESCRIPTION OF THE INVENTION

Figure 1:
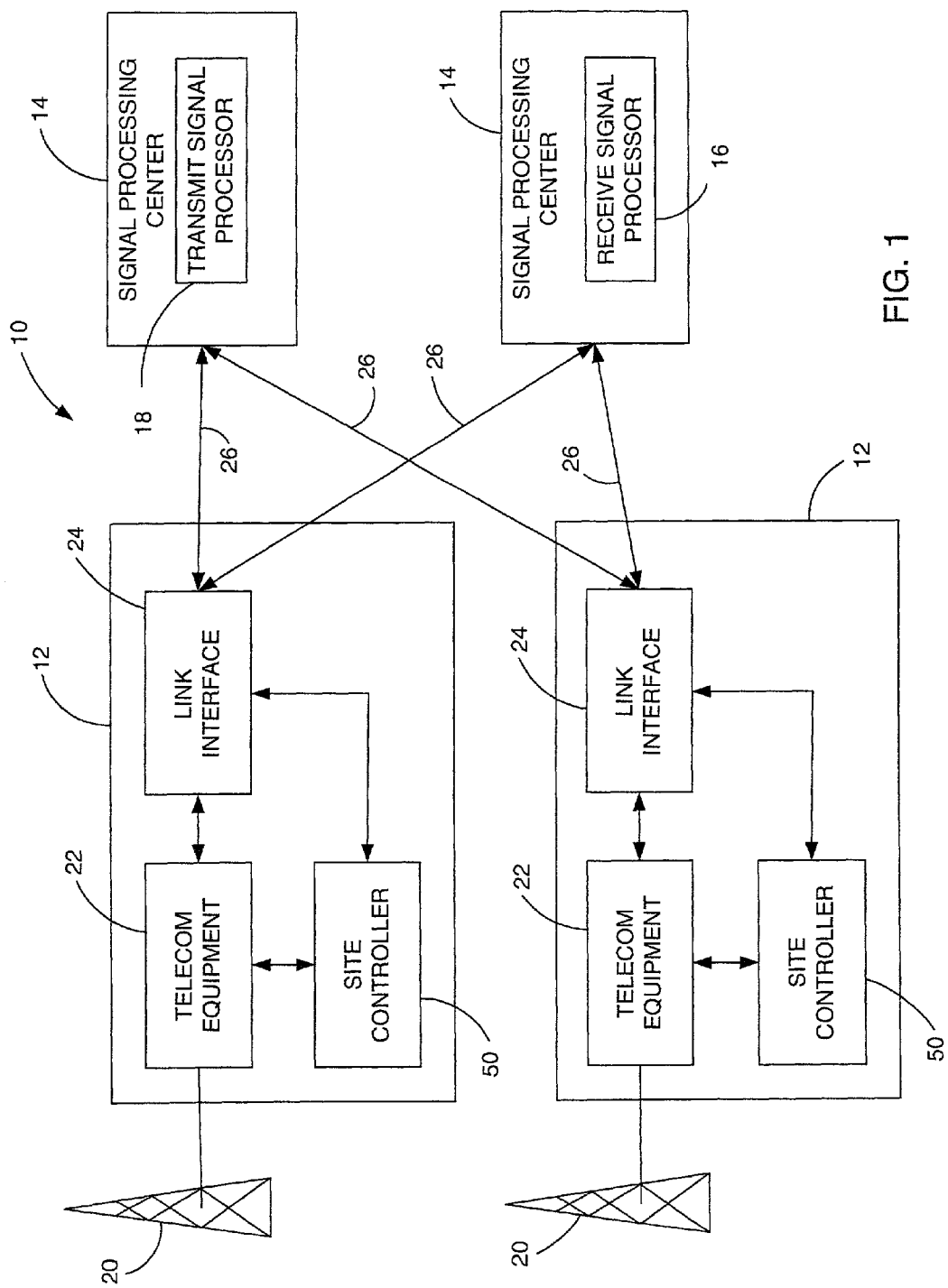
FIG. 1 is a functional block diagram illustrating a mobile communication network according to the present invention.

Referring now to the drawings, FIG. 1 illustrates a mobile communication network indicated generally by the numeral 10 according to the present invention. The mobile communication network 10 comprises a plurality of antenna sites 12 and one or more signal processing centers 14. The signal processing centers 14 are connected to the antenna sites 12 via communication links 26, which are described in greater detail below. The antenna sites 12 include one or more antennas 20, telecommunications equipment 22, such as transmitters and receivers, for communicating with mobile terminals, and a site controller 50. Additionally, each antenna site 12 includes a link interface 24 including multiplexing and demultiplexing equipment connecting the antenna site 12 to one or more signal processing centers 14.

Signal processing centers 14 may comprise a receive signal processor 16, a transmit signal processor 18, or both. The receive signal processor 16 receives downconverted signals from one or more antenna sites and processes the received signals. Such processing may include diversity combining, error decoding, and other digital signal processing functions typically performed at each antenna site 12 in prior art systems.

The transmit signal processor 18 generates modulating signals that are forwarded to the antenna sites 12 for modulation onto a carrier and transmission to mobile terminals. The modulating signals may be forwarded to one or more antenna sites 12 depending upon the implementation. For example, a single modulating signal may be provided to multiple antenna sites 12 for transmission to a single mobile terminal to implement transmit diversity. The transmit signal processor 18 may also implement coherent transmit macrodiversity as described in my copending U.S. patent application Ser. No. 09/915896 filed Jul. 26, 2001 and entitled, "Communication System Employing Transmit Macro-Diversity." This application is incorporated herein by reference.

The receive signal processor 16 and transmit signal processor may be located at the same signal processing center 14, or may be at different signal processing centers 14. The signal processing centers 14 may be located at one of the antenna sites 12, or some other location. There is no requirement that the signal processing centers 14 be owned by the same entity as the antenna sites 12. Similarly, there is no requirement that all of the antenna sites 12 be owned by the same entity. The network architecture according to the present invention allows multiple telecommunications service providers to share the same equipment and/or antenna sites 12, which may be owned by one of the service providers or some other entity. Using the network architecture of the present invention, more than one receive signal processor 16 and more than one transmit signal processor 18 may be coupled to each antenna site 12. The signal processing centers 14 would typically be owned by a telecommunications service provider. The antenna sites 12 and the equipment located therein may be owned by one of the telecommunications service providers, or by a third party. As will be described in greater detail below, the present invention also provides a method of accounting for usage of the equipment by different telecommunications service providers to facilitate billing.

Because multiple service subscribers may use the same antenna site 12 and associated equipment to transmit signals to and receive signals from their subscribers, an agreed link protocol needs to be established for transmitting signals between the signal processing centers 14 and antenna sites 12. One protocol contemplated for the present invention comprises the exchange of numerically encoded complex baseband samples, commonly known as I, Q samples, that are representative of a modulation of a radio frequency carrier. Modulation schemes such as GMSK, QPSK, OQPSK, 8-PSK, 16 QAM, and similar modulations may be used. Transmission of numerical I, Q samples expands the bandwidth or bit rate over the communication link 26 compared with the bandwidth occupied by the raw samples, but this expansion of bandwidth may be minimized by use of a suitable high-order, multi-level encoding system, such as 256 QAM or higher, which are particularly suited to I, Q value transmission. Another method that avoids bandwidth expansion is to use an analog quadrature multiplex of the I, Q signals as described in U.S. Pat. No. 5,619,210, which is incorporated herein by reference.

In addition to the exchange of I, Q modulating signals, the link protocol for communications between the signal processing centers 14 and antenna sites 12 may include means to request assignment of a particular radio frequency channel and/or timeslot for a particular I, Q stream; means to specify a transmit power level if not already inherent in the scaling of the I, Q samples; means to indicate an absolute time at which a particular I, Q sample shall be modulated onto the assigned carrier, and conversely; means to indicate the time of reception of I, Q samples downconverted from a receiver. The protocol can, for example, use a GPS-based time standard at each antenna site 12 to establish a common time and frequency reference to which demultiplexed I, Q samples may be retimed.

Using an (I,Q) sample interface leaves the choice of encoding or modulation to the telecommunications service provider. Thus, different service providers may use different encoding and modulation schemes at their respective signal processing centers 14. The use of an I, Q sample interface also facilitates the implementation of coherent transmit macrodiversity as described in the above incorporated patent application. The present invention, however, is also useful for implementing noncoherent macrodiversity due to the increase in the number of antenna sites available to each service provider.

Figure 2:
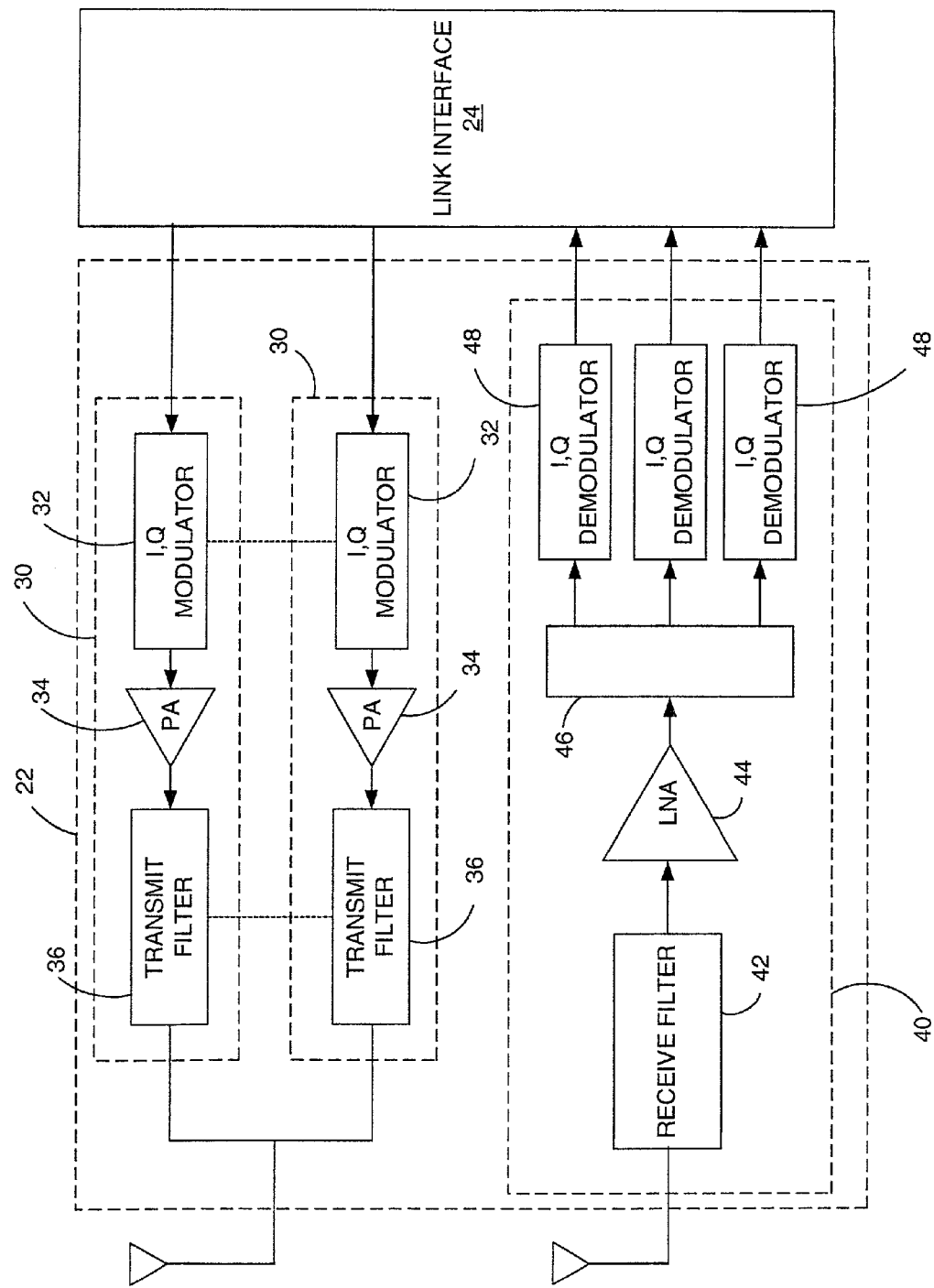
FIG. 2 is a functional block diagram of an exemplary antenna site in the mobile communication network.

FIG. 2 is a more detailed diagram of the telecommunications equipment 22 in an exemplary antenna site 12. As shown in FIG. 2, each antenna site 12 comprises a plurality of transmitters 30 and receivers 40. Transmitters 30 receive I, Q samples through link interface 24 from the signal processing centers 14. The I, Q samples are modulated onto an RF carrier by a selected transmitter 30. Each transmitter 30 comprises an I, Q modulator 32, power amplifier 34, and a transmit filter 36 which couples the transmitter 30 to the transmit antenna 20. In the reverse direction, a receive antenna (which may be the same as the transmit antenna) is connected to a receive filter 42. The output of the receive filter 42 is applied to a low noise amplifier 44. The output of the low noise amplifier 44 is applied to a distribution amplifier 46 which distributes the received signals to a bank of I, Q demodulators 48, each of which is tuned to select and demodulate signals at a particular frequency. The demodulated signals are then output from the I, Q demodulators 48 to the link interface 24. Those skilled in the art will recognize that the present invention is not limited to the particular type of telecommunications equipment 22 and that additional equipment not shown in FIG. 2 may be implemented at the antenna site 12.

Figure 3:
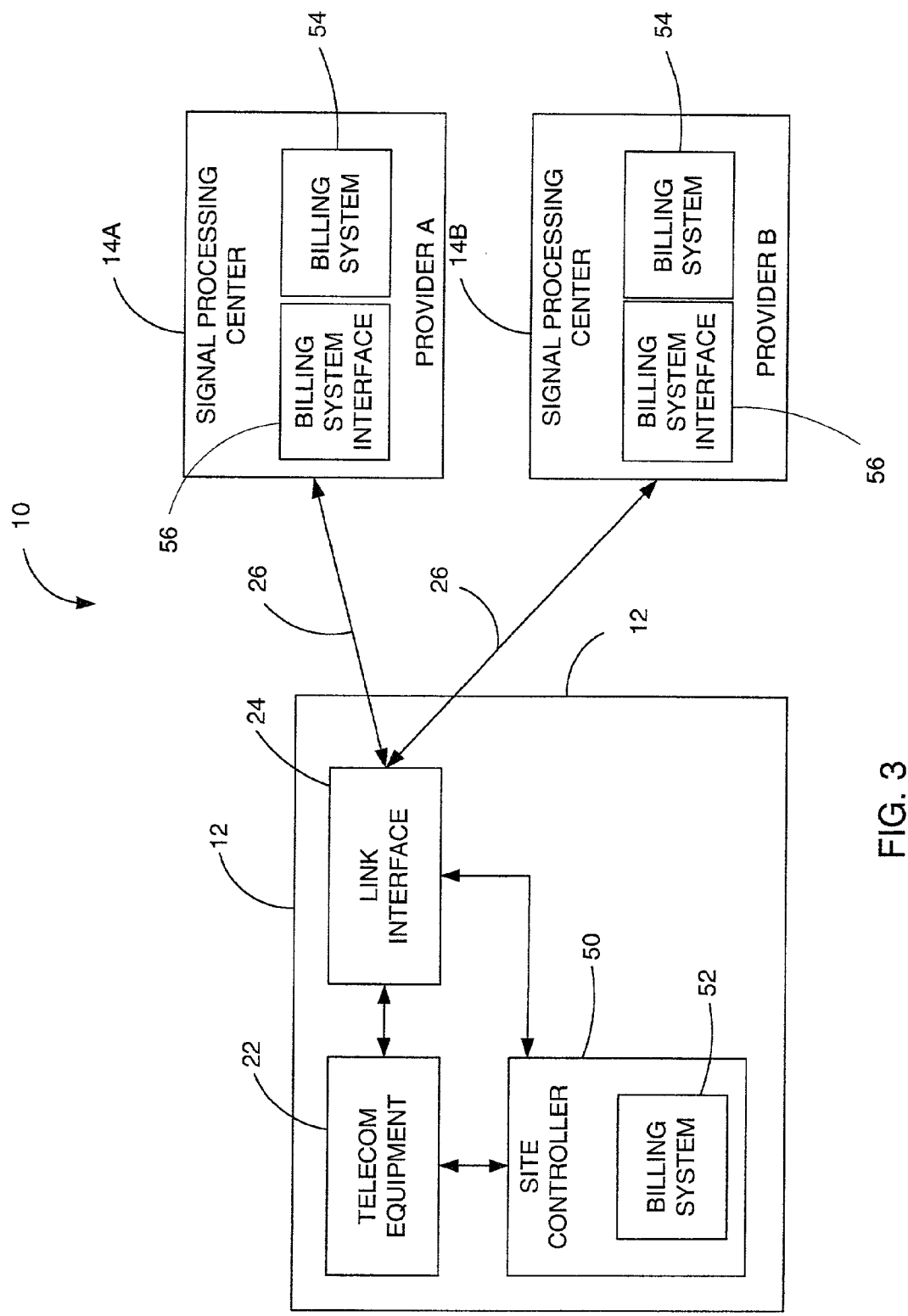
FIG. 3 is a functional block diagram of a mobile communication network according to the present invention showing two service providers sharing a single antenna site.

FIG. 3 illustrates one example of how two service providers can share the communication resources of a single antenna site 12. As shown in FIG. 3, an antenna site 12 is coupled to two separate signal processing centers 14 operated by two different service providers, which are designated herein as service provider A and service provider B. Service provider A has been allocated 15 MHz of bandwidth and service provider B has been allocated 5 MHz of bandwidth contiguous with service provider A's allocated bandwidth. In the prior art, service provider A would receive signals using its antenna sites 12 and allocated bandwidth, while service provider B would receive signals using different antenna sites 12 and service provider B's allocated bandwidth. According to the present invention, service provider A and service provider B may pool their bandwidth allocations at one or more shared antenna sites 12. The shared antenna sites 12 would receive signals in the entire 20 MHz band allocated to both service providers and forward the received signals following downconversion to the appropriate service provider. That is, signals received in the 15 MHz band allocated to service provider A would be forwarded to service provider A's signal processing center 14, and signals received in the 5 MHz band allocated to service provider B would be forwarded to service provider B's signal processing center 14. The shared antenna sites 12 would also transmit signals for the entire 20 MHz band allocated to service providers A and B. In the transmit direction, service provider A forwards modulating signals from signal processing center 14A to one or more shared antenna sites 12 to be broadcast over its 15 MHz band, and service provider B forwards modulating signals from its signal processing center 14B to the same shared antenna sites 12 to be broadcast over its 5 MHz band.

Using the network architecture according to the present invention, capital costs for operating and maintaining antenna sites 12 and associated telecommunications equipment 22 may be significantly reduced, since more than one telecommunications service provider is able to use the same telecommunications equipment located at a single antenna site 12. Additionally, the present invention enables service providers to employ transmit and receive diversity to improve network performance. For example, using the present invention, service provider A may receive signals at two or more antenna sites 12, one or more of which may be owned by another entity. Absent the sharing arrangement, service provider A would have to maintain each separate antenna site 12 but, because of the present invention, service provider A may receive signals from its subscribers at an antenna site 12 owned and operated by a different service provider or by a third party. Similarly, a service provider may transmit signals to a mobile terminal from an antenna site 12 owned by another party to implement transmit diversity.

There is no requirement in the present invention that all of the elements of the communication network 10 be owned by the same entity. For example, service providers A and B may each separately own antenna sites 12 which they allow the other to use. In this situation, each service provider would bill the other service provider for use of the resources at its antenna sites 12. Thus, service provider A would bill service provider B for B's use of A's communication resources, and service provider B would bill service provider A for A's use of B's communications resources. In the above example, if the shared antenna site 12 is owned by service provider A, it could bill service provider B for providing 5 MHz of bandwidth to service provider B. Conversely, if the shared antenna site 12 is owned by service provider B, it could bill service provider A for providing 15 MHz of bandwidth to service provider A. In addition, the possibility is open for one service provider to allow use of its allocated spectrum by the other service provider. Thus, service provider A might allow service provider B to temporarily use all or part of provider A's spectrum, and vice versa.

Using the present invention, it is also possible for a third party to build and operate an antenna site 12 that is made available to telecommunications service providers. The antenna site 12 may include telecommunications equipment to receive and transmit signals anywhere in a Personal Communication Services (PCS) or cellular band. The antenna site operator could allow multiple service providers to use the same transmitters 30 and receivers 40 to transmit and receive signals in the signal bands allocated to the service providers. Thus, in this example, service provider A could use the antenna site 12 and its associated resources to transmit and receive signals in the band allocated to service provider A, and service provider B could use the same antenna site 12 and associated resources to transmit and receive signals in the band allocated to service provider B. Arrangements could also be made between service providers to allow one service provider to use a portion of the bandwidth allocated to another service provider. The site operator would bill the respective service providers either a fixed amount related to the amount of spectrum assigned, or alternatively, based on a bandwidth-time product that reflects usage of the transmit and receive equipment or other resources at the antenna site 12. Such equipment sharing is likely to reduce the cost for both service providers to provide communication services as well as improving the quality of services provided.

In order to allow sharing of antenna sites 12, telecommunications equipment 22, or other resources, arrangements must be made to bill for the use of resources shared by two or more service providers. As shown in FIG. 3, a first billing system 52 is associated with an antenna site 12 to generate an electronic accounting of antenna, equipment, or bandwidth resources provided to or used by each service provider. The antenna site operator transmits an accounting to each service provider using that antenna site 12. Each service provider also maintains a second billing system, referred to herein as the subscriber billing system 54, for billing its subscribers for communication services provided to those subscribers. The subscriber billing systems 54 operated by each service provider integrate with the antenna site billing system 52. As shown in FIG. 3, a billing system interface 56 allows the subscriber billing system 54 to receive data from the antenna site billing system 52. The billing system interface 56 may be implemented as a module within the second billing system 54, as a separate application, or a combination thereof. Thus, the subscriber billing systems 54 can factor in the cost of antenna site resources. The subscriber billing systems 54 can be part of a local switching center (LSC) associated with the signal processing centers 14 without necessarily being co-located with the signal processing centers 14. Alternatively, the subscriber billing systems 54 can be part of an Internet service provider's business equipment for providing IP-based communications or Internet access.

The antenna site billing system 52 can generate an accounting of resources in a number of ways. One method is to generate a bill for the amount of equipment or bandwidth resources permanently assigned to a particular service provider, whether those resources are fully utilized or not. Another method may allow equipment to be dynamically allocated to operate in the fixed amount of spectrum owned by the respective service providers when less equipment is provided than necessary to utilize the entire spectrum at once. Thus, billing would not be fixed but would vary with equipment utilization. A third billing method would allow spectrum owned by one service provider to be temporarily reallocated for use by another. In this case, the owner of the "borrowed" spectrum would receive an accounting for the use of its spectrum by other service providers, allowing service providers to cross-bill for use of their bandwidth. Thus, the antenna site billing system could function as a clearing system for cross-billing between service providers.

Figure 4:
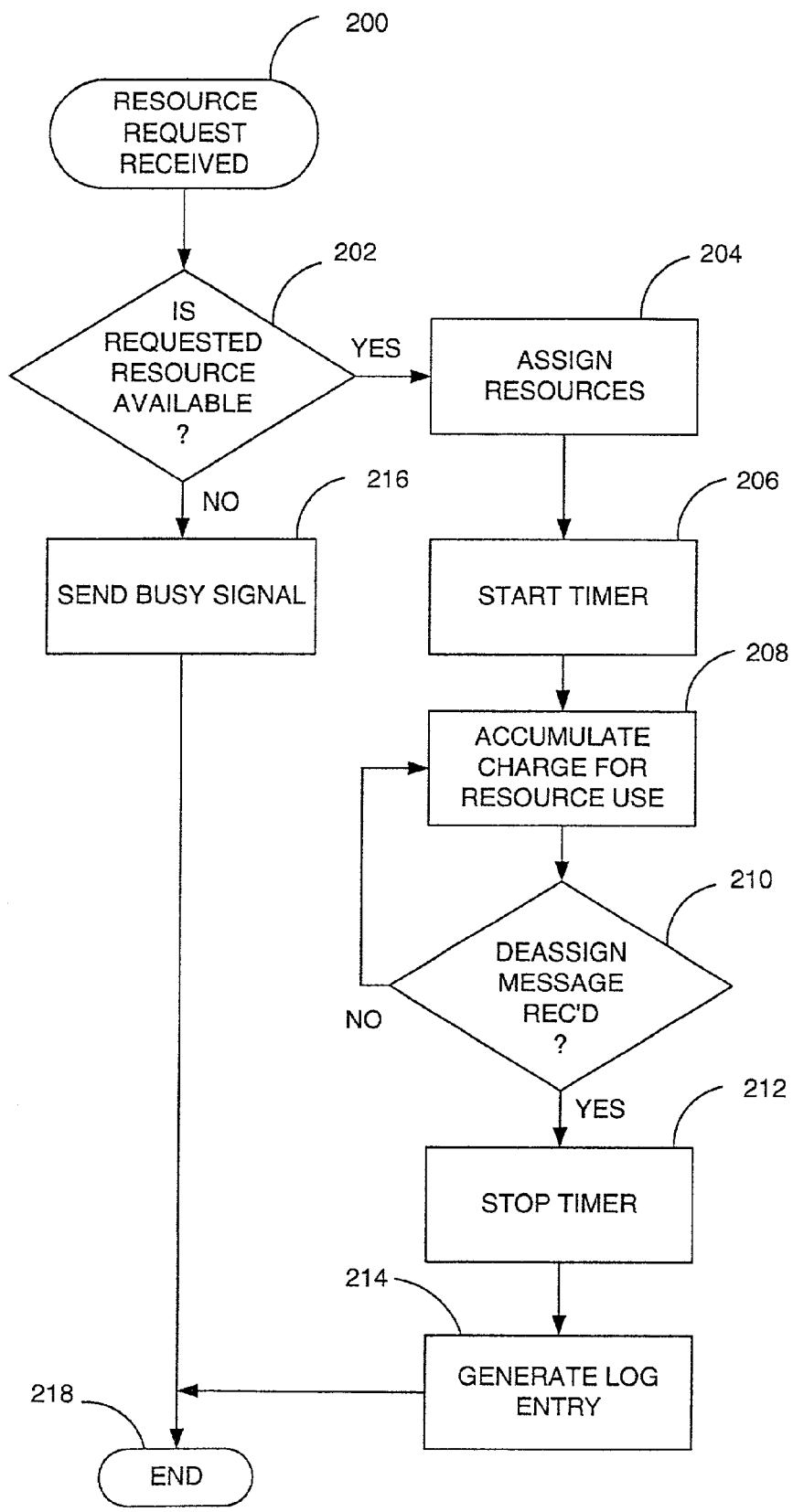
FIG. 4 is a flow diagram illustrating an exemplary procedure for billing for the use of resource at a shared antenna site.

FIG. 4 illustrates one exemplary method of billing for use of shared communication resources at an antenna site 12. At step 200, a site controller 50 receives a resource allocation request from one of the service providers using the antenna site 12. The resource may comprise any communication resource such as antennas, spectrum, transmit and receive equipment, or link bandwidth. At step 202, the site controller 50 determines whether the requested resources are available and, if so, assigns the requested resources at step 204. If the requested resources are not available, the site controller 50 sends a busy signal at step 216 to the service provider and the process ends at step 216. After assigning resources to a service provider at step 204, the site controller 50 starts a timer at step 206 and begins accumulating charges for the resource use at step 208. The site controller 50 periodically checks for a message from the service provider to deallocate the resources at step 210. If a deallocation message is not received, the charge for resource use continues to accumulate. Once a deallocation message is received from the service provider at step 210, the site controller 50 stops the timer at step 212 and then enters the charges into a log at step 214. The reporting of charges back to the service provider may follow immediately, or alternatively, can be accumulated and transmitted at a later time. For example, the service providers may establish predetermined dates to receive an accounting from each antenna site 12. A system could also be established to allow service providers to receive an accounting "on demand."

The present invention allows antenna sites 12, transmit and receive equipment, and even spectrum to be shared between multiple telecommunications service providers while apportioning the cost of such antenna sites, equipment and spectrum in a fair manner. Apart from the economic benefits, communication quality benefits from the ability to access a larger number of antenna sites 12 allowing more frequent use of transmit and receive diversity to improve communications.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A communication network comprising:
an antenna site including a shared transmitter used by two or more service providers to transmit signals to mobile subscribers;
a first signal processing center connected to said antenna site and belonging to a first service provider to generate a first modulating signal, wherein said first modulating signal is used at said antenna site to modulate an RF carrier; and
a second signal processing center connected to said antenna site and belonging to a second service provider to generate a second modulating signal, wherein said second modulating signal is used at said antenna site to modulate an RF carrier.

2. The communication network of claim 1 wherein said first and second modulating signals comprise I, Q modulating signals.

3. The communication network of claim 1 wherein said transmitter operates over a frequency band comprising a first frequency spectrum allocated to said first service provider and a second frequency spectrum allocated to said second service provider.

4. The communication network of claim 3 wherein said first and second modulating signals are used by said transmitter to modulate radio frequency carriers in different portions of said frequency bands.

5. The communication network of claim 4 wherein said first modulating signal is used by said transmitter to modulate a radio frequency carrier in said first frequency spectrum, and wherein said second modulating signal is used by said transmitter to modulate a radio frequency carrier in said second frequency spectrum.

6. The communications network of claim 1 further comprising a billing module at said antenna site to account for usage of said shared transmitter by said first and second service providers.

7. The communication network of claim 6 wherein said billing module accounts for usage of said transmitter based on a bandwidth-time product.

8. An antenna site in a communications network, said antenna site comprising:
at least one shared transmitter used by two or more service providers to communicate with mobile subscriber terminals; and
an interface to connect said antenna site with signal processing centers operated by each of said service providers, wherein said signal processing centers provide modulating signals to said antenna site that are used by said transmitter to modulate a radio frequency carrier.

9. The antenna site of claim 8 wherein said modulating signals comprise I, Q modulating signals.

10. The antenna site of claim 9 wherein said billing module accounts for usage of said transmitter based on a bandwidth-time product.

11. The antenna site of claim 8 wherein said transmitter operates over a frequency band comprising a first frequency spectrum allocated to a first service provider and a second frequency spectrum allocated to a second service provider.

12. The antenna site of claim 11 wherein said modulating signals from different signal processing centers are used by said transmitter to modulate radio frequency carriers in different portions of said frequency band.

13. The antenna site of claim 12 wherein said modulating signals from a first signal processing center are used by said transmitter to modulate a radio frequency carrier in said first frequency spectrum, and wherein said modulating signals from a second signal processing center are used by said transmitter to modulate a radio frequency carrier in said second frequency spectrum.

14. The antenna site of claim 8 further comprising a billing module to account for usage of said shared transmitter by said two or more service providers.

15. A communication network comprising:
an antenna site including a shared receiver used by two or more service providers to receive and demodulate signals from mobile subscriber terminals;
a first signal processing center connected to said antenna site and belonging to a first service provider to process demodulated signals transmitted from said antenna site to said first service provider; and
a second signal processing center connected to said antenna site and belonging to a second service provider to process demodulated signals transmitted from said antenna site to said second service provider.

16. The communication network of claim 15 wherein said antenna site converts received signals to I,Q samples.

17. The communication network of claim 15 wherein said receiver operates over a frequency band comprising a first frequency spectrum allocated to said first service provider and a second frequency spectrum allocated to said second service provider are pooled at said antenna site.

18. The communication network of claim 17 wherein signals received at said antenna site in said first frequency spectrum are forwarded to said first service provider and wherein signals received at said antenna site in said second frequency spectrum are forwarded to said second service provider.

19. The communications network of claim 15 further comprising a billing module at said antenna site to account for usage of said shared receiver by said first and second service providers.

20. The communication network of claim 19 wherein said billing module accounts for usage of said transmitter based on a bandwidth-time product.

21. An antenna site in a communications network, said antenna site comprising:
at least one shared receiver used by two or more service providers to communicate with mobile subscriber terminals, said shared receiver including at least one demodulator for demodulating received signals; and an interface having demultiplexing circuitry that connects said antenna site with signal processing centers operated by each of said service providers for transmitting said demodulated signals to said signal processing centers.

22. The antenna site of claim 21 wherein said antenna site converts received signals to I,Q samples.

23. The antenna site of claim 21 wherein said receiver operates over a frequency band comprising a first frequency spectrum allocated to a first service provider and a second frequency spectrum allocated to a second service provider are pooled at said antenna site.

24. The antenna site of claim 23 wherein signals received at said antenna site in said first frequency spectrum are forwarded to said first service provider and wherein signals received at said antenna site in said second frequency spectrum are forwarded to said second service provider.

25. The antenna site of claim 21 further comprising a billing module at said antenna site to account for usage of said shared receiver by said first and second service providers.

26. The antenna site of claim 25 wherein said billing module accounts for usage of said transmitter based on a bandwidth-time product.

* * * * *